Aug. 7, 1951     V. C. DUGAN     2,563,321
FEEDING APPARATUS
Filed Jan. 16, 1948
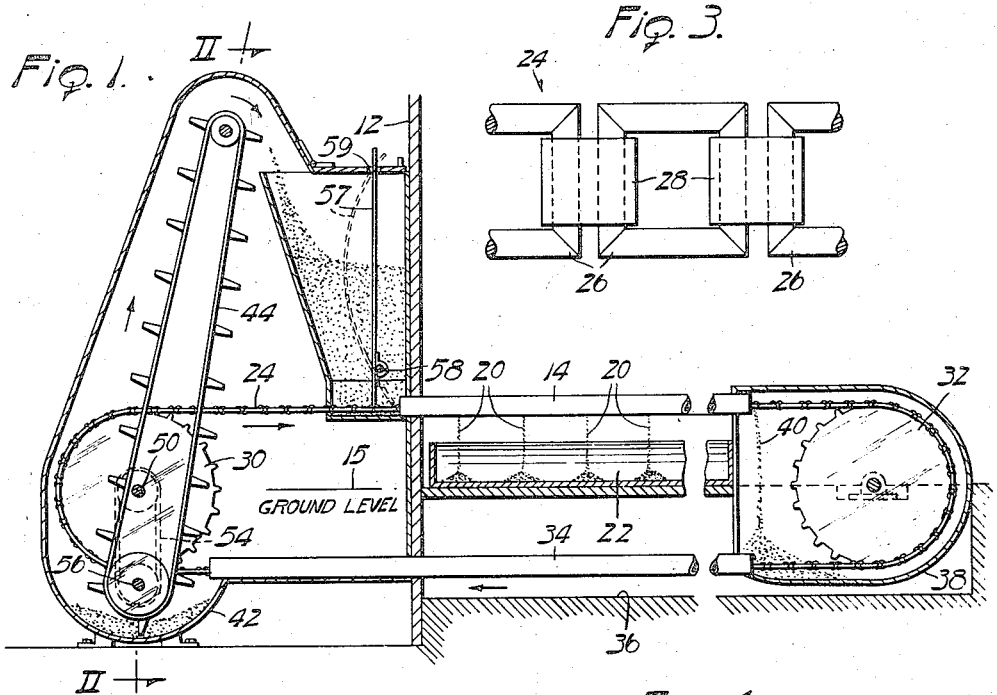
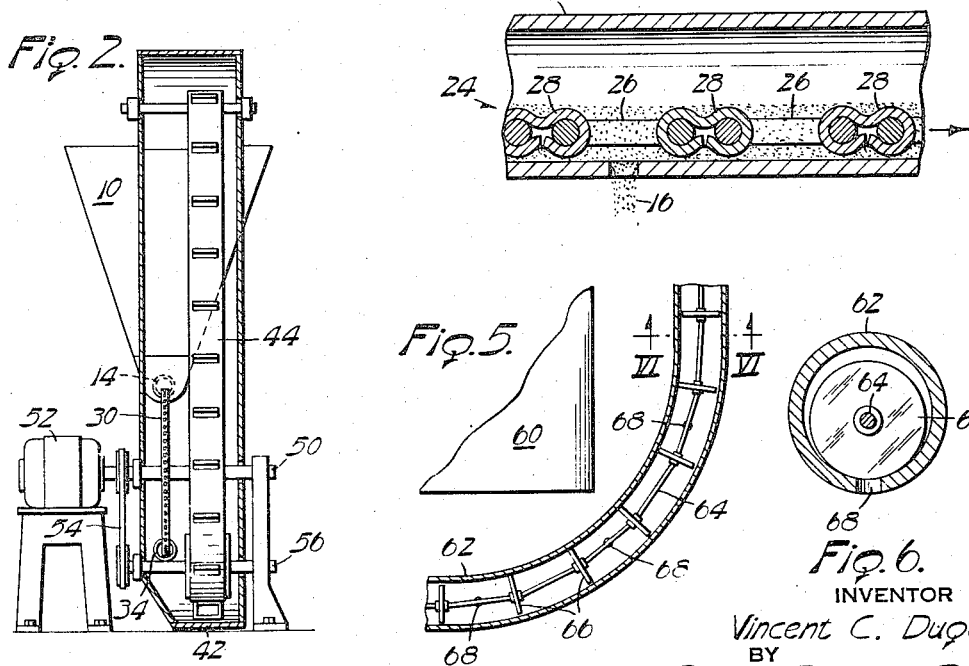
INVENTOR
Vincent C. Dugan
BY
Beau, Brooks, Buckley & Beau
ATTORNEYS Patented Aug. 7, 1951

2,563,321

UNITED STATES PATENT OFFICE 2,563,321

FEEDING APPARATUS

Vincent C. Dugan, Buffalo, N. Y.

Application January 16, 1948, Serial No. 2,611

4 Claims. (Cl. 119—51)

This invention relates to animal husbandry, and more particularly to an improved method and means for feeding animal flocks, as in the case of poultry and the like.

One of the objects of the invention is to provide an improved flock feeding mechanism whereby at preselected times a predetermined quantity of feed is automatically distributed in improved manner for flock consumption.

Another object of the invention is to provide an improved mechanism for the purposes aforesaid whereby to obtain improved sureness and efficiency of operation.

Other objects and advantages of the invention will appear from the specification hereinafter.

In the drawings:

Fig. 1 is a longitudinal sectional view through a mechanism of the invention;

Fig. 2 is a vertical section taken along line II—II of Fig. 1;

Fig. 3 shows an enlarged detail of the mechanism;

Fig. 4 is a fragmentary longitudinal section on an enlarged scale through a feed conveying portion of the mechanism;

Fig. 5 is a fragmentary plan view, partly in section, showing a modified form of the feed conveyor device; and Fig. 6 is a section, on an enlarged scale, taken along line VI—VI of Fig. 5.

The drawing illustrates the invention as being embodied in a mechanism especially designed for poultry flock feeding purposes, but it is to be understood that the invention is equally applicable to mechanisms for feeding other farm animals, particularly wherever it is desirable to simultaneously distribute feed to a plurality of feeding stations so as to avoid dangerous crowding of the feeding animals. Thus, the mechanism of the invention is illustrated in the drawing to comprise a feed hopper 10 which is preferably mounted interiorly of a farm building structure such as indicated at 12, for weather protection purposes. The bottom of the hopper 10 is arranged in communication with a feed delivery conduit 14 which extends through the building wall 12 and thence outwardly over the feeding range; the conduit 14 being supported at suitable intervals so as to be maintained at a slight elevation above the ground level of the feeding range which is indicated at 15 (Fig. 1). At suitable intervals lengthwise of the conduit 14 it is apertured as indicated at 16 (Fig. 4) through the bottom wall portion thereof so as to permit feed to be gravity-discharged therethrough as indicated at 20 in Fig. 1. The feed may be permitted to fall from the conduit directly onto the ground, or preferably one or more suitable feeding troughs may be set to catch the falling feed as indicated at 22, whereby to avoid contamination of the feed with ground debris. The volume of feed to be piled under any one of the feeding stations may be regulated by adjusting the vertical distance between the bottom of the feed trough 22 and the conduit 14.

An endless drag conveyor device is arranged to slide through the conduit 14 for conveying feed progressively to the series of apertures 16. For example, as illustrated in Figs. 1-4, the conveyor may be of simple detachable link type chain such as is widely employed for driving farm machinery and the like; the chain being designated 24 in Fig. 1 and illustrated in Figs. 3-4 to comprise links 26 interconnected by malleable metal clips 28. The chain 24 is carried by sprockets 30—32 at opposite ends thereof, and the return strand of the chain is illustrated as being enclosed within a return conduit 34. Conveniently, the sprockets 30—32 are journaled upon bearings supported at ground level while the return conduit 34 is disposed within a trench 36 leading back to the building wall 12. Thus, the sprocket 32 is conveniently enclosed within a top cover and boot shell 38 (Fig. 1) which is adapted to catch any excess of feed carried by the top strand of the conveyor and not discharged through the conduit apertures 16. Thus, such excess feed will simply pour out of the end of the conduit 14 as is indicated at 40 in Fig. 1, and will thereupon fall into the bottom of the boot 38 to be reentrained with the bottom strand of the conveyor chain and dragged thereby through the return conduit and delivered into the boot 42 of a bucket elevator 44 which is arranged to discharge the excess feed back into the hopper 10.

As shown in Figs. 1-2 the chain sprocket 30 is mounted upon a shaft 50 which connects to an electric motor 52, and an endless belt 54 which is driven by the shaft 50 is arranged to drive the elevator pulley shaft 56. Thus, upon operation of the motor 52 the feed conveyor and elevator mechanisms will be simultaneously driven in the directions indicated by the arrows in the drawing, thereby pulling the feed out of the hopper 10 for discharge through the feed distributing apertures 16; while any excess feed not accepted by the apertures 16 will be discharged from the open end of the conduit 14 and then picked up again by the lower strand of the chain 24 and thence delivered to the elevator 44 and returned to the hopper 10.

Thus, it will be appreciated that if in connection with any operation of the motor 52 one or more of the piles of feed under the apertures 16 does not need replenishment, there will nevertheless be no jamming of the parts or interference with the operation of the mechanism which will continue to run to insure maintenance of an evenly distributed supply of feed at all of the feed stations under the apertures 16. Thus, this mechanism lends itself particularly to fully automatic control such as by a clock mechanism set to close the motor control switch at given times, so that the only manual attention required is in connection with keeping the hopper 10 supplied with feed. For example, the control clock may be set to start feeding at any specified hour and a circuit opening switch which is responsible to the weight of the feed within the hopper may be arranged so as to shut off the motor after a predetermined quantity of feed has been dispensed. Or, the control clock mechanism may be set to permit feeding for a predetermined length of time, whichever may be preferred; but as explained hereinabove in any case the nature of the feeding apparatus is such as to enable it to be fully automatically controlled without possibility of jamming or damage to any of the parts irrespective of the rate at which the feeding animals eat away the feed at the several feed stations. Also, for example, even though the animals at some of the feed stations may scratch away and scatter the feed issuing thereto at much faster rate than the animals at some of the other stations, the feed will nevertheless continue to be substantially uniformly distributed among the several feeding stations because the rates of feed flow at the stations are controlled by the sizes of the orifices 16. Therefore, it is a particular feature and advantage of the invention that the mechanism is adapted to operate without any attention except to see that a supply of feed is maintained in the hopper 10, whereby the poultry farmer employing the machine of the invention is assured of perfect feeding operations with a minimum of required labor and attention.

To facilitate free discharge of the feed material from the hopper 10 into the feeding conduit 14, any suitable form of feed agitating device may be employed, if required. However, as illustrated in Fig. 1, an improved form of feed agitator for this purpose is illustrated to comprise a strip 57 formed of spring steel or the like, which is pivotally suspended by means of a pivot pin 58 extending transversely from the side walls of the hopper. The strip 57 is so mounted upon the pin 58 that the lower end of the strip 57 will interfere with the topmost portions of the drag conveyor elements while the upper end of the strip 57 slip-fits through a suitable apertured portion 59 of the top cover plate of the hopper structure. Thus, as the conveyor moves through the conduit 14 the lower end of the strip 57 is intermittently caught by upwardly projecting portions of the conveyor chain and momentarily dragged thereby so as to deflect the spring strip 57 until the lower end of the spring strip slides over the chain projection and permits the strip to snap back into its normal shape. Consequently, during operation of the drag conveyor the spring strip 57 is maintained in a state of agitation, and this motion is transmitted to the supply of feed within the hopper 10 so as to prevent clogging or blocking of the feed in the hopper.

Figs. 5–6 illustrate another form of feed conveyor arrangement such as is adapted to negotiate turns around obstacles such as farm buildings and the like. For example, the corner of a farm building is illustrated in plan view at 60 (Fig. 5) and a feed conveying conduit 62 is illustrated as being curved around the building corner. The feed conveying device within the conduit 62 is shown as being in the form of an endless flexible cable or rope 64 or the like, carrying flights or washers 66 at intervals therealong. It will be understood that the conduit 62 will be suitably apertured at the desired feeding station points as indicated at 68, in a manner similar to the aperturing of the conduit 14 illustrated in Fig. 4. Or, the conduit may be arranged to climb over obstacles or to sink under floor surfaces or the like during portions of the conveyor travel; and thus it will be appreciated that the conduit 62 may be arranged to twist or turn in any desired direction between its inlet and outlet ends, as may be dictated by any specific installation problems.

I claim:

1. A flock feeding mechanism for distributing feed supplies to spaced feeding range stations, said mechanism comprising a feed hopper, a conduit leading from said hopper at an elevation above the feeding range, said conduit having feed discharging openings through a wall portion thereof at intervals lengthwise of the conduit, an endless strand partially enclosed within said conduit and extending at opposite ends therebeyond, a first sprocket rotatively mounted adjacent one end of said conduit, a second sprocket rotatively mounted adjacent the other end of said conduit, a return conduit in alignment between said sprockets, said endless strand extending through said conduits and trained around said sprockets to provide a travelling endless strand drag conveyor system within each of said conduits, a bucket elevator arranged to receive conveyor discharge from said return conduit and to deliver the latter into said hopper, whereby upon operation of said conveyor and said elevator mechanism feed will be dragged from said hopper and gravity-discharged through said openings, and whereby feed within said conveyor not received by said openings will be discharged from said conveyor into said return conduit and thereby delivered to said elevator and returned to said hopper.

2. A flock feeding mechanism for distributing feed supplies to spaced feeding range stations, said mechanism comprising a feed hopper, a feeding conduit leading from said hopper at an elevation above the feeding range, said conduit having feed discharging openings through a wall portion thereof at intervals lengthwise of the conduit, an endless drag conveyor sliding through said conduit and extending at its opposite ends therebeyond, a first sprocket rotatively mounted adjacent one end of said conduit, a second sprocket rotatively mounted adjacent the other end of said conduit, a return conduit in alignment between said sprockets, said endless conveyor extending through both of said conduits and around said sprockets to provide a drag conveyor system within each of said conduits, a bucket elevator arranged to receive conveyor discharge from said return conduit and to deliver the latter into said hopper, whereby upon operation of said conveyor and said elevator mechanism feed will be dragged from said hopper and gravity-discharged through said openings, and whereby feed within said conveyor not received by said openings will be discharged from said feed conduit into said return conduit and thereupon delivered to said elevator and returned to said hopper.

3. A flock feeding mechanism for distributing feed supplies to spaced feeding range stations, said mechanism comprising a feed hopper, a feeding conduit leading away from said hopper, said conduit having feed discharging openings through a wall portion thereof at intervals lengthwise of the conduit, an endless drag conveyor sliding through said conduit and extending at its opposite ends therebeyond, a first sprocket rotatively mounted adjacent one end of said conduit, a second sprocket rotatively mounted adjacent the other end of said conduit, a return conduit in alignment between said sprockets, said endless conveyor extending through both of said conduits and around said sprockets to provide a drag conveyor system within each of said conduits, means arranged to receive conveyor discharge from said return conduit and to deliver the latter into said hopper, whereby upon operation of said mechanism feed will be dragged from said hopper and gravity-discharged through said openings, and whereby feed within said conveyor not received by said openings will be discharged from said feed conduit into said return conduit and returned to said hopper.

4. A flock feeding mechanism for distributing feed supplies to spaced feeding range stations, said mechanism comprising a feed hopper, a feeding conduit leading from said hopper at an elevation above the feeding range, said conduit having feed discharging openings through a wall portion thereof at intervals lengthwise of the conduit, an endless drag conveyor sliding through said conduit and extending at its opposite ends therebeyond, a first sprocket rotatively mounted adjacent an end of said conduit, a second sprocket rotatively mounted adjacent the other end of said conduit, a return conduit in alignment between said sprockets, said endless conveyor extending through both of said conduits and around said sprockets to provide a drag conveyor system within each of said conduits, a bucket elevator arranged to receive conveyor discharge from said return conduit and to deliver the latter into said hopper, and an agitator within said hopper, whereby upon operation of said conveyor and said elevator mechanism feed will be dragged from said hopper and gravity-discharged through said openings, and whereby feed within said conveyor not received by said openings will be discharged from said feed conduit into said return conduit and delivered to said elevator and returned to said hopper .

VINCENT C. DUGAN.

REFERENCES CITED

The following references are of record in the file of this patent:

UNITED STATES PATENTS

| Number | Name | Date |
| --- | --- | --- |
| 426,245 | Craig | Apr. 22, 1890 |
| 1,753,050 | Hughes | Apr. 1, 1930 |

FOREIGN PATENTS

| Number | Country | Date |
| --- | --- | --- |
| 32,148 | France | Apr. 26, 1927 |
| 629,844 | Germany | May 14, 1936 |
| 515,102 | Great Britain | Nov. 27, 1939 |
| 98,000 | Sweden | Feb. 6, 1940 |